US012621791B2

(12) United States Patent
Alasti et al.

(10) Patent No.: US 12,621,791 B2
(45) Date of Patent: May 5, 2026

(54) TERRESTRIAL NETWORK (TN) AND NON-TERRESTRIAL NETWORK (NTN) INTERFERENCE MANAGEMENT

(71) Applicant: Boost SubscriberCo L.L.C., Englewood, CO (US)

(72) Inventors: Mehdi Alasti, Arlington, VA (US); Jingyi Zhou, Belle Mead, NJ (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 419 days.

(21) Appl. No.: 18/160,237

(22) Filed: Jan. 26, 2023

(65) Prior Publication Data

US 2024/0259983 A1 Aug. 1, 2024

(51) Int. Cl.
| | |
|---|---|
| *H04W 64/00* | (2009.01) |
| *H04W 16/14* | (2009.01) |
| *H04W 60/06* | (2009.01) |
| H04W 84/06 | (2009.01) |

(52) U.S. Cl.
CPC ........... *H04W 64/00* (2013.01); *H04W 16/14* (2013.01); *H04W 60/06* (2013.01); *H04W 84/06* (2013.01)

(58) Field of Classification Search
CPC ..... H04W 64/00; H04W 16/14; H04W 60/06; H04W 84/06
See application file for complete search history.

(56) References Cited

U.S. PATENT DOCUMENTS

| | | | | |
|---|---|---|---|---|
| 2013/0295950 A1* | 11/2013 | Ruuska | ................. | H04W 72/56 |
| | | | | 455/452.1 |
| 2017/0272131 A1* | 9/2017 | Ananth | ................ | H04B 7/0413 |
| 2022/0232463 A1* | 7/2022 | Sadique | ................ | H04W 48/18 |
| 2024/0204862 A1* | 6/2024 | Macias | ............... | H04W 36/322 |

OTHER PUBLICATIONS

International Search Report and Written Opinion, dated Jun. 5, 2024, for International Patent Application No. PCT/US2024/012824. (16 pages).
Liang et al., "Realizing Intelligent Spectrum Management for Integrated Satellite and Terrestrial Networks," *Journal of Communications and Information Networks* 6(1): 32-43, Mar. 2021.
Yan et al., "Interference Management in 6G Space and Terrestrial Integrated Networks: Challenges and Approaches," *Intelligent and Converged Networks* 1(3): 271-280, Dec. 2020.

* cited by examiner

*Primary Examiner* — Dai Phuong
(74) *Attorney, Agent, or Firm* — Seed Intellectual Property Law Group LLP

(57) ABSTRACT

Technologies for managing interference between terrestrial network (TN) and non-terrestrial network (NTN) are disclosed. An example method includes determining a location of a user equipment (UE), assessing potential interference between TN and NTN based on the determined UE location and spectrum band coverage information of TN and NTN, acting on the UE's connection to the NTN or a request from the UE for connection to the NTN based on the assessed potential interference, and updating the spectrum band coverage information of TN and NTN.

20 Claims, 7 Drawing Sheets

NTN n256 (TR 38.863):

NTN n255 (TR 38.863):

- S-band NTN-TN adjacent band coexistence scenarios with TN in FDD mode – 3GPP TR 38.863

• S-band NTN-TN adjacent band coexistence scenarios with TN in TDD mode (e.g. n34) - 3GPP TR 38.863

TERRESTRIAL NETWORK (TN) AND NON-TERRESTRIAL NETWORK (NTN) INTERFERENCE MANAGEMENT

BACKGROUND

In telecommunications, 5G is the fifth-generation technology standard for broadband cellular networks. 5G networks are cellular networks, in which the service area is divided into small geographical areas called cells. In a terrestrial network (TN), user equipment (UE) can communicate by radio waves with a cellular base station (e.g., located on a cellular tower) via fixed antennas, over frequency channels. The base stations can be connected to switching centers in the telephone network and routers for Internet access by high-bandwidth optical fiber or wireless backhaul connections. A non-terrestrial network (NTN) uses an Earth-orbiting satellite as a base station that communicates with an earthbound UE. In TNs and NTNs, time and frequency resources that are available for use in uplink and downlink channels are limited.

BRIEF SUMMARY

In some embodiments, a computer-implemented method for managing interference between a TN and an NTN includes determining a location of a UE, assessing potential interference between the TN and NTN based, at least in part, on the determined UE location and spectrum band coverage information of the TN and NTN, acting on the UE's connection to the NTN or a request from the UE for connection to the NTN based, at least in part, on the assessed potential interference, and updating the spectrum band coverage information of the TN and NTN.

In some embodiments, the location of the UE includes a geographic point or area where the UE is currently connected with or attempting to connect with the TN or NTN. In some embodiments, the determining of the location of the UE is based on at least one of Global Navigation Satellite System (GNSS) or Global Positioning System (GPS) that the UE supports. In some embodiments, assessing potential interference between the TN and NTN comprises determining at least one of spectrum overlap or spectrum coexistence between the TN and NTN.

In some embodiments, acting on the UE's connection to the NTN or a request from the UE for connection to the NTN comprises at least one of deregistering the UE connected to the NTN, maintaining the UE's connection to the NTN, rejecting the request from the UE for connection to the NTN, or accepting the request from the UE for connection to the NTN. In some embodiments, at least one of the deregistering the UE connected to the NTN or rejecting the request from the UE for connection to the NTN is performed in accordance with Mobility Management and Session Management procedures.

In some embodiments, the spectrum band coverage information of the TN and NTN includes a map indicating geographical coverage of one or more spectrum bands used by the TN or NTN.

In some embodiments, an interference management system for terrestrial network (TN) and non-terrestrial network (NTN) includes at least one memory that stores computer executable instructions and at least one processor that executes the computer executable instructions to cause actions to be performed. The actions include determining a location of a UE, assessing potential interference between a TN and an NTN based, at least in part, on the determined UE location and spectrum band coverage information of the TN and NTN, and acting on the UE's connection to the NTN or a request from the UE for connection to the NTN based, at least in part, on the assessed potential interference.

In some embodiments, the location of the UE includes a geographic point or area where the UE is currently connected with or attempting to connect with the TN or NTN. In some embodiments, assessing potential interference between the TN and NTN comprises determining at least one of spectrum overlap or spectrum coexistence between the TN and NTN.

In some embodiments, acting on the UE's connection to the NTN or a request from the UE for connection to the NTN comprises at least one of deregistering the UE connected to the NTN, maintaining the UE's connection to the NTN, rejecting the request from the UE for connection to the NTN, or accepting the request from the UE for connection to the NTN. In some embodiments, at least one of the deregistering the UE connected to the NTN or rejecting the request from the UE for connection to the NTN is performed in accordance with Mobility Management and Session Management procedures.

In some embodiments, the actions further comprise obtaining updated spectrum band coverage information of the TN and NTN.

In some embodiments, a non-transitory computer-readable medium stores contents that, when executed by one or more processors, cause the one or more processors to perform actions. The actions include determining a location of a UE, assessing potential interference between a TN and an NTN based, at least in part, on the determined UE location and spectrum band coverage information of the TN and NTN; and acting on the UE's connection to the NTN or a request from the UE for connection to the NTN based, at least in part, on the assessed potential interference.

In some embodiments, the location of the UE includes a geographic point or area where the UE is currently connected with or attempting to connect with the TN or NTN. In some embodiments, the actions further comprise updating at least a portion of the spectrum band coverage information. In some embodiments, assessing potential interference between the TN and NTN comprises determining at least one of spectrum overlap or spectrum coexistence between the TN and NTN.

In some embodiments, acting on the UE's connection to the NTN or a request from the UE for connection to the NTN comprises at least one of deregistering the UE connected to the NTN, maintaining the UE's connection to the NTN, rejecting the request from the UE for connection to the NTN, or accepting the request from the UE for connection to the NTN. In some embodiments, at least one of the deregistering the UE connected to the NTN or rejecting the request from the UE for connection to the NTN is performed in accordance with Mobility Management and Session Management procedures.

In some embodiments, the spectrum band coverage information of the TN and NTN includes a map indicating geographical coverage of one or more spectrum bands used by the TN or NTN.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Figure 1:
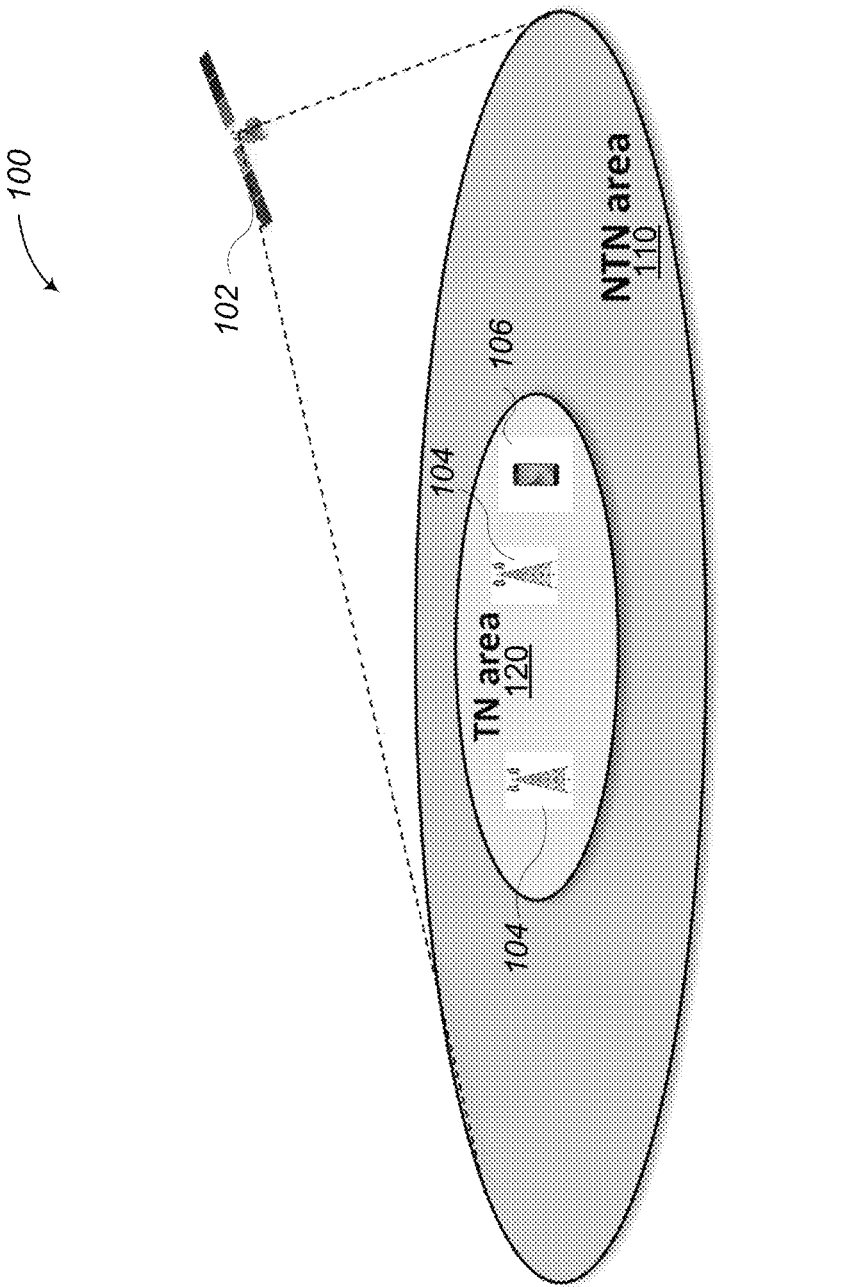
FIG. 1 shows a terrestrial network (TN) and non-terrestrial network (NTN) environment for interference management in accordance with one or more embodiments of the presently disclosed technology.

FIG. 1 shows a terrestrial network (TN) and non-terrestrial network (NTN) environment 100 for interference management in accordance with one or more embodiments of the presently disclosed technology. The environment 100 includes one or more NTN stations 102. The NTN station 102 can be a satellite, orbiter, or space-based station that orbits the earth or other astronomical object (e.g., planet, moon) in space. The NTN station 102 can be in geostationary orbit (~35,000 km), middle earth orbit (7000-25000 km), low earth orbit (300-1500 km), high elliptical orbit (400-50,000 km), or other orbital pattern. If NTN station 102 is a regenerative satellite, the satellite may be a base station (denoted as 'NodeB' or in a 5G network as 'gNB') in a NTN, and various implementaion scenarios can include, e.g., only the radio unit (RU) component of the gNB be on the payload, RU and distributed unit (DU) be on the payload, or all the gNB components RU, DU and centralized unit (CU) be on the payload. If the NTN station 102 is a bent-pipe satellite (also known as a transparent satellite or transparent payload), the corresponding base station may be located elsewhere (e.g., earthbound and on the ground) in the NTN and the NTN station 102 may act as a relay for the base station. The NTN station 102 has a coverage area 110 that may be divided into a plurality of geographic areas (not illustrated), whereby each geographic area may be smaller than the coverage area 110.

The environment 100 includes one or more TN base stations 104 located on the ground. The TN base station 104 can be a ground-based system that includes a wireless transmitter, a wireless receiver, and a processor or controller configured to wirelessly communicate with one or more UE 106. The TN base station(s) has a coverage area 120 that at least partially overlaps the NTN area 110. The TN area 120 may include one or more cells. Coverage of each cell can vary depending on the elevation antenna of the cell, the height of the antenna of the cell above the ground, the electrical tilt of the antenna, the transmit power utilized by the cell, or other capabilities that can be different from one type of cell to another or from one type of hardware to another.

The one or more UE 106 are each processor-based devices located on or near the surface of the earth (e.g., in a user's hand, in a building, in a vehicle, on a boat, in an airplane, or the like) and that are each configured to be capable of wirelessly communicating with a NTN station 102 and TN base station 104. The UE 106 may be a satellite phone, a computer system, or mobile device (e.g., cellular phone, tablet computer, internet-of-things device). The UE 106 may include a satellite communication receiver, one or more processors, one or more antennae, and memory storing instructions that, as a result of execution by the one or more processors, cause the UE 104 to perform relevant operations described herein.

The above description of the exemplary networked environment 100 and the various services, systems, networks, and devices therein is intended as a broad, non-limiting overview of an example environment in which various embodiments of the presently disclosed technologies may be implemented. Although embodiments are directed to 5G cellular communications, embodiments are not so limited and other types of cellular communications technology may also be utilized or implemented. FIG. 1 illustrates just one example of an operating environment, and the various embodiments discussed herein are not limited to such an environment. In particular, the networked environment 100 may contain other devices, systems, or media not specifically described herein.

Illustratively, there are two types of spectrum challenges that can cause interference between TN and NTN: spectrum overlap and coexistence (i.e., out of band emission (OOBE) of the adjacent bands). More specifically for TN-NTN spectrum overlap, NTN spectrum bands can have complete or partial overlap with one or more TN bands.

Figure 2:
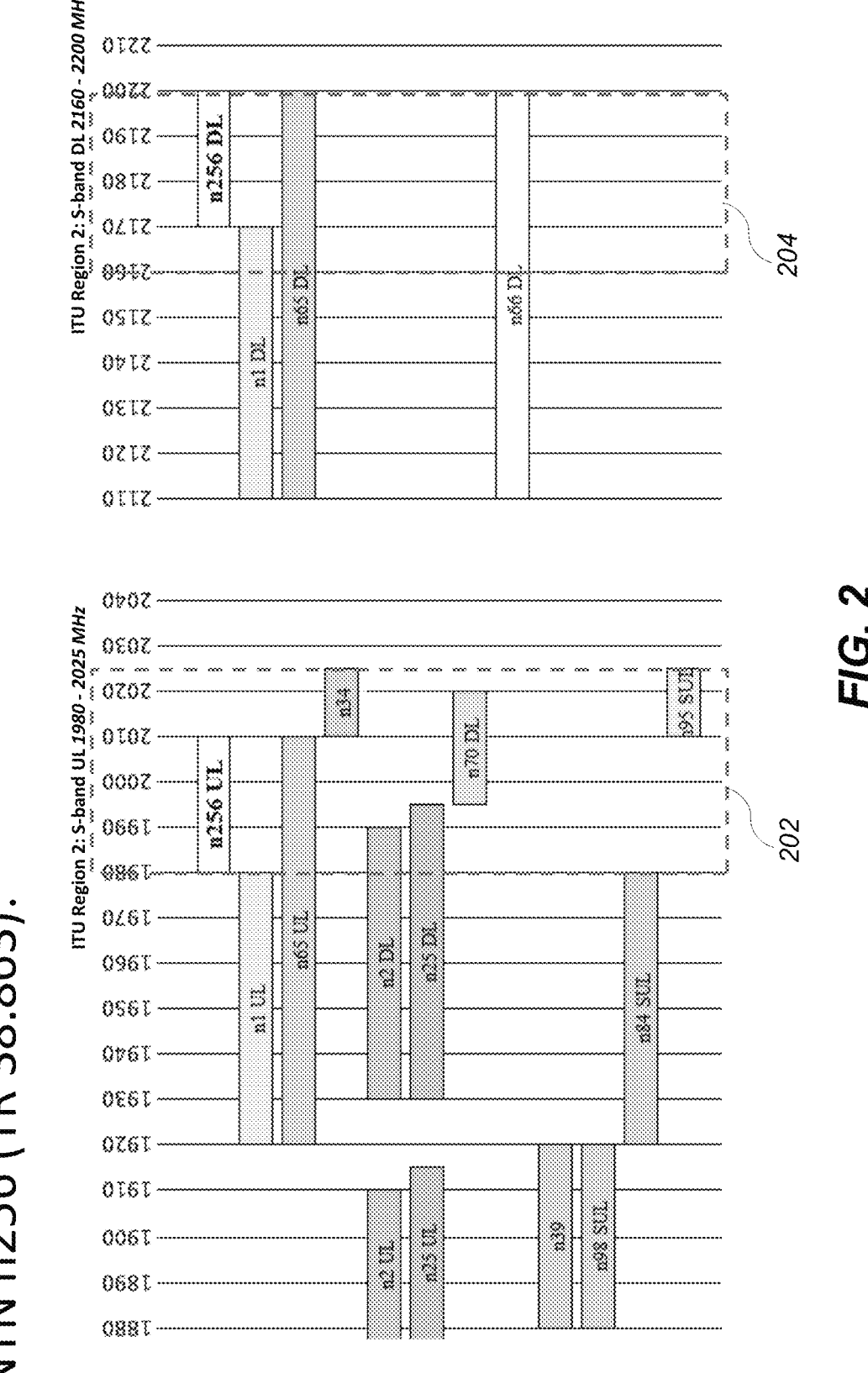
FIG. 2 shows NTN n256 band's uplink (UL) and downlink (DL) overlapping with TN bands.

For example, FIG. 2 shows NTN n256 band's uplink (UL) 202 and downlink (DL) 204 overlapping with TN bands. NTN n256 UL 202 completely or partially overlaps with TN n65 UL, TN n34 (Time Division Duplex (TDD)), TN n2 DL, TN n25 DL, TN n70 DL, and TN n95 Supplementary Uplink (SUL); NTN n256 DL 204 completely overlaps with TN n65 DL and TN n66 DL.

Figure 3:
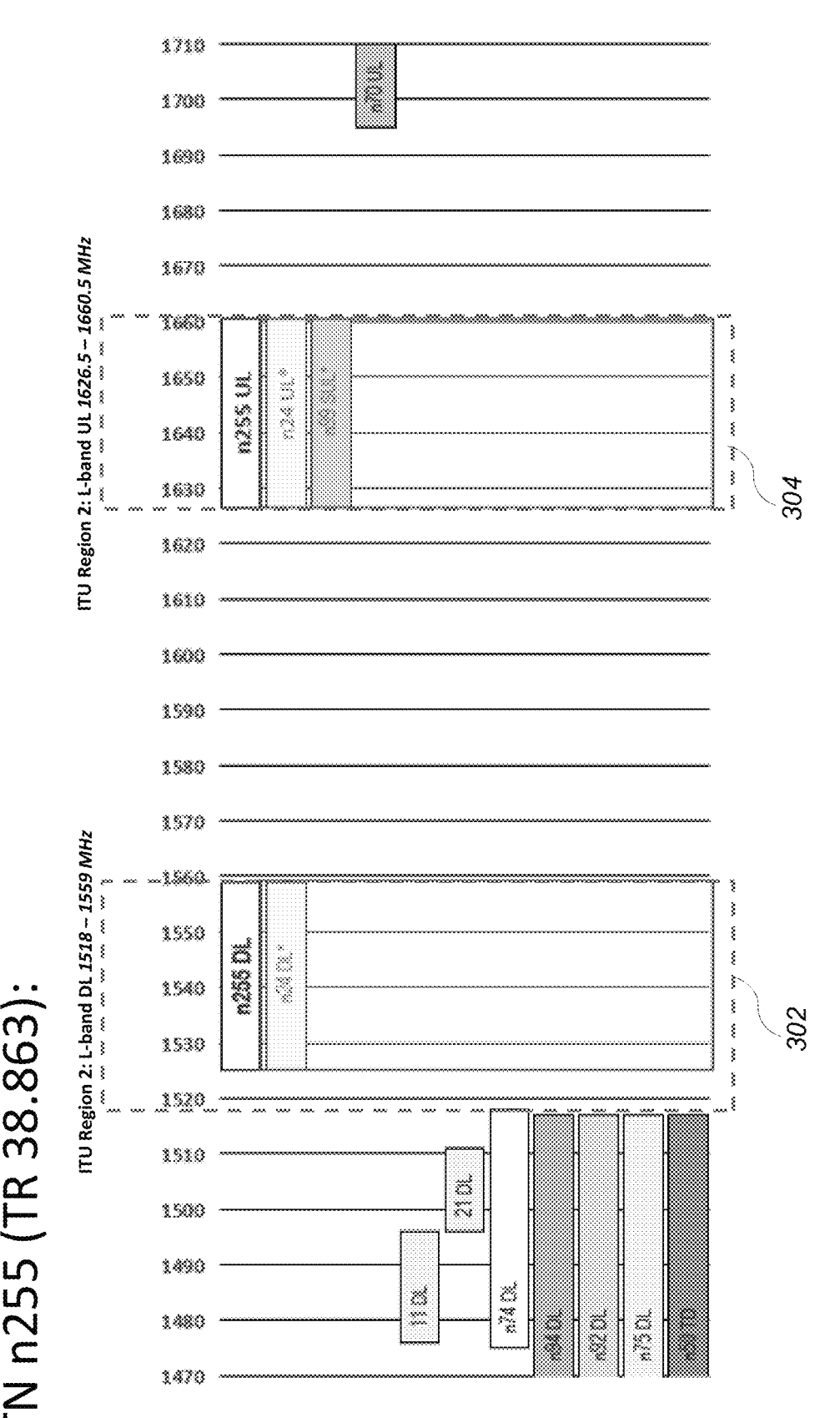
FIG. 3 shows NTN n255 band's DL and UL overlapping with TN bands.

As another example, FIG. 3 shows NTN n255 band's DL 302 and UL 304 overlapping with TN bands. NTN n255 DL 302 completely overlaps with TN n24 DL; NTN n255 UL 304 completely overlaps with TN n24 UL and TN n99 SUL.

In some cases, TN and NTN do not have overlapping spectrum but they are holding adjacent spectrum bands, and they may suffer from out-of-band-emission (OOBE). This is referred to as TN-NTN spectrum coexistence (i.e., out of band emission of the adjacent bands). There can be 6 types of interference caused by TN-NTN spectrum coexistence as shown in FIGS. 4 and 5.

Figure 4:
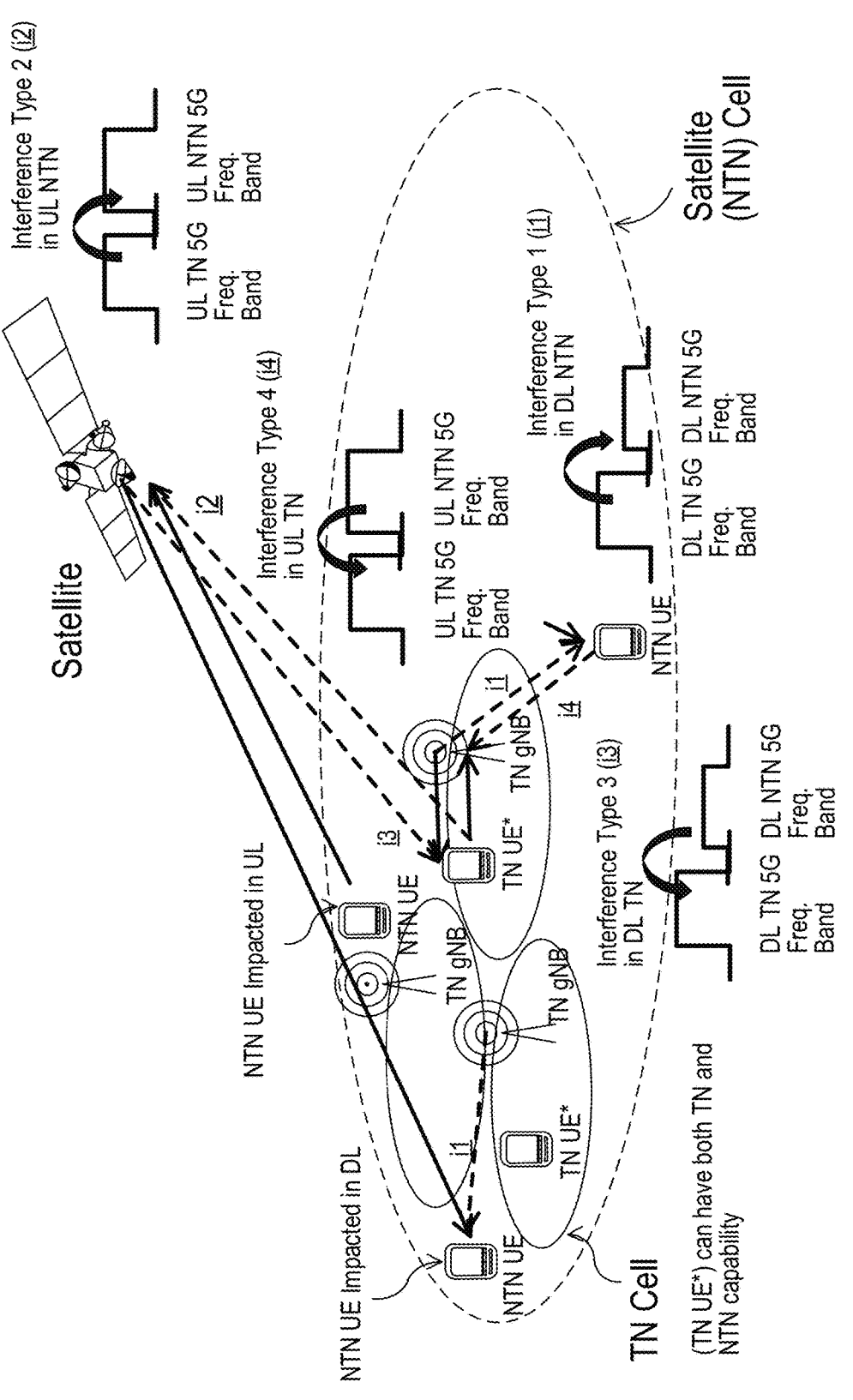
FIGS. 4 and 5 show various types of interferences associated with TN-NTN spectrum coexistence.
Figure 5:
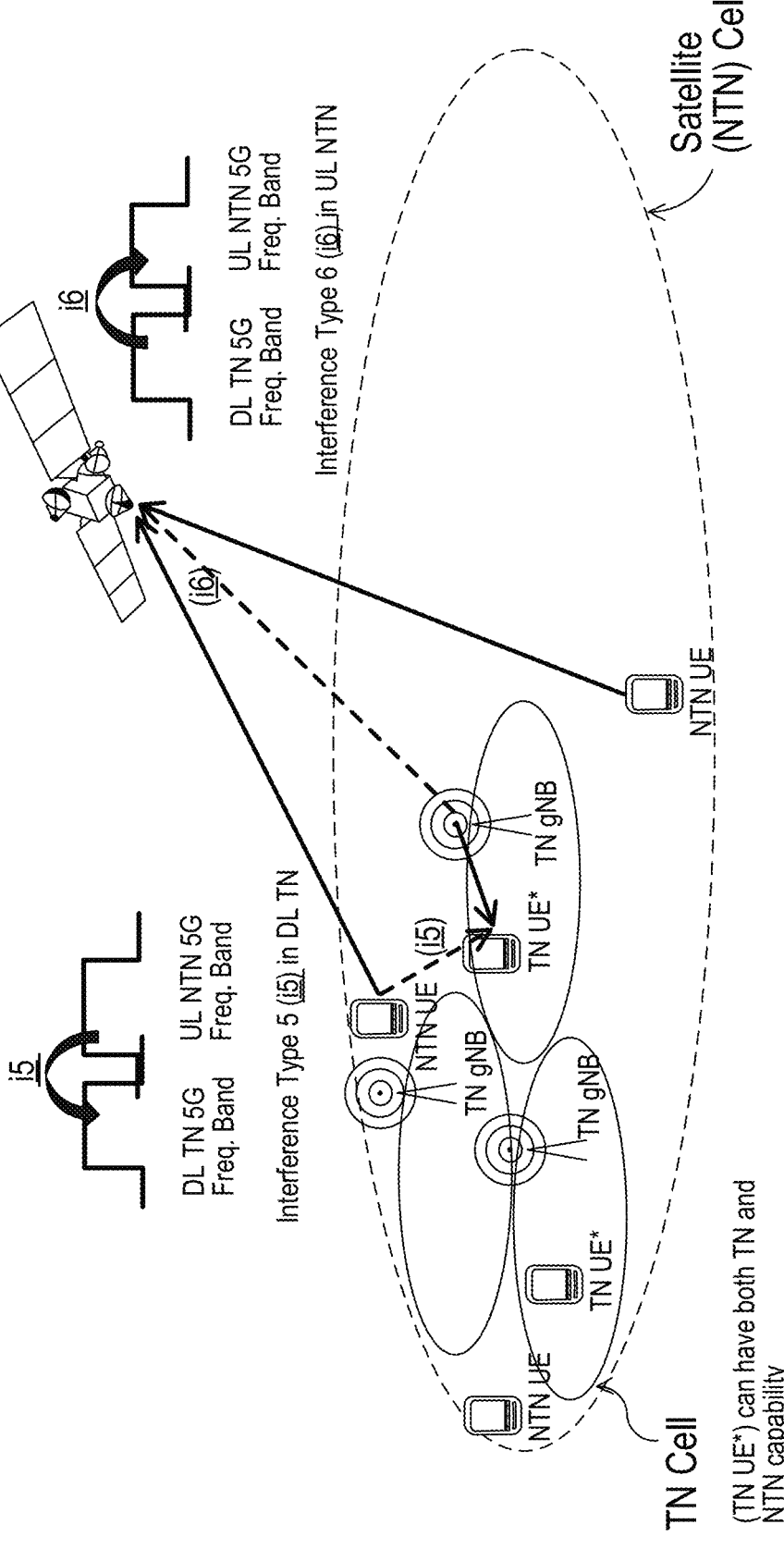

As shown in FIG. 4, Interference Type 1 (i1) occurs when TN DL is an aggressor (e.g., the spectrum band causing interference) and NTN DL is a victim (e.g., the desired spectrum band for use) in its communication with a UE. Illustratively, the NTN operates in S-band, which has coexistence with TN n1 FDD.

Interference Type 2 (i2) occurs when TN UL is an aggressor and NTN UL is a victim in its communication with a UE. Illustratively, the NTN operates in S-band, which has coexistence with TN n1 FDD.

Interference Type 3 (i3) occurs when NTN DL is an aggressor and TN DL is a victim in its communication with a UE. Illustratively, the NTN operates in S-band, which has coexistence with TN n1 FDD.

Interference Type 4 (i4) occurs when NTN UL is an aggressor and TN UL is a victim in its communication with a UE. Illustratively, the NTN operates in S-band, which has coexistence with TN n1 FDD.

As shown in FIG. 5, Interference Type 5 (i5) occurs when NTN UL is an aggressor and TN DL is a victim in its communication with a UE. Illustratively, the NTN operates in S-band, which has coexistence with TN n34 TDD.

Interference Type 6 (i6) occurs when TN DL is an aggressor and NTN UL is a victim in its communication with a UE. Illustratively, the NTN operates in S-band, which has coexistence with TN n34 TDD.

Figure 6:
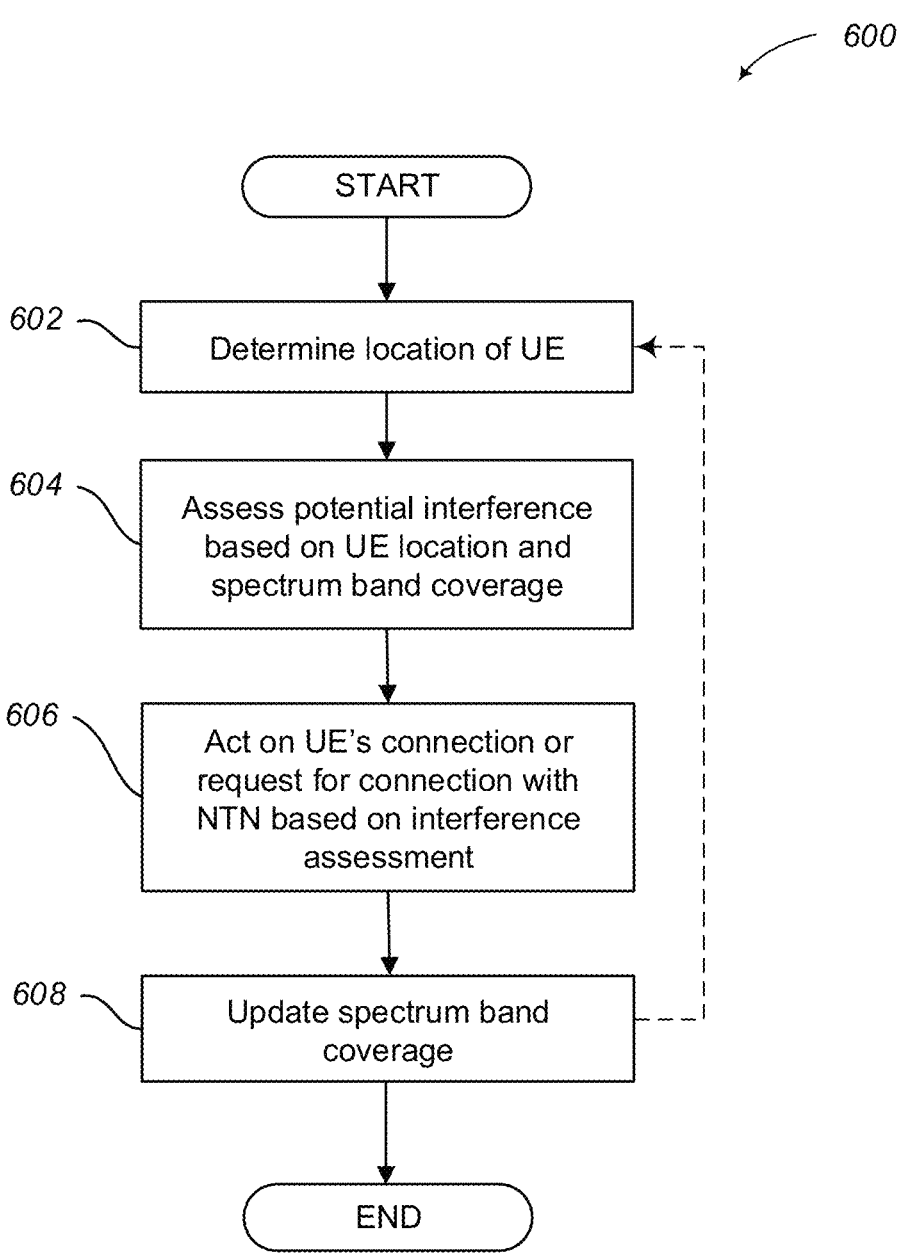
FIG. 6 is a flow diagram depicting an example process for managing TN-NTN interference in accordance with one or more embodiments of the presently disclosed technology.

FIG. 6 is a flow diagram depicting an example process 600 for managing TN-NTN interference in accordance with one or more embodiments of the presently disclosed technology. In various embodiments, the process 600 is performed in real time, and at least some part of the process 600 is performed in a transparent manner to a user of UE. Illustratively, at least some part of the process 600 can be implemented by an NTN station 102 (or its corresponding base station), a backhaul computing system, a UE 106, or an applicable component of network core in accordance with the environment 100 of FIG. 1.

The process 600 starts at block 602, which includes determining a location of a UE. The location of the UE can be a geographic point or area where the UE is currently connected with or attempting to connect with a TN or NTN. In some embodiments, the UE supports Global Navigation Satellite System (GNSS) or Global Positioning System (GPS), thereby enabling the UE or the NTN to determine the UE's accurate location.

At block 604, the process 600 includes assessing potential interference between the TN and NTN based, at least in part, on the determined UE location and spectrum band coverage information of the TN and NTN. In some embodiments, the spectrum band coverage information can be obtained from an applicable component of the network core, a third party system or service, or active probing of TN or NTN stations. The coverage information can include a map or other applicable representation that indicates geographical coverage of one or more spectrum bands used by the TN or NTN. The assessment can be performed by searching the coverage information to identify all applicable spectrum bands used by the TN and NTN, at or near (e.g., within a proximity threshold) the determined UE location, and thereby determining whether there is any spectrum overlap or spectrum coexistence between the TN and NTN.

At block 606, the process 600 includes acting on the UE's connection to the NTN or a request from the UE for connection to the NTN based, at least in part, on the assessed potential interference. Acting on the UE's connection to the NTN or a request from the UE for connection to the NTN can include at least one of deregistering the UE connected to the NTN, maintaining the UE's connection to the NTN, rejecting the request from the UE for connection to the NTN, or accepting the request from the UE for connection to the NTN. In some embodiments, a scanning or probing can be performed before the acting to determine whether the UE is currently using the TN or NTN, and based on which, to further determine whether to proceed with the acting.

In some embodiments, the deregistering the UE connected to the NTN or rejecting the request from the UE for connection to the NTN is performed in accordance with Mobility Management and Session Management procedures. Illustratively, when Access and Mobility management Function (AMF) receives an NG Application Protocol (NGAP) message containing User Location Information for the UE using NR NTN access, AMF can decide to reject any Non-access Stratum (NAS) request; if UE is already registered to the NTN when AMF determines that it is not allowed to operate at the present UE location, AMF may initiate deregistration of the UE.

Accordingly, if the potential interference corresponds to spectrum overlap, actions can be performed to deregister the UE connected to the NTN when the UE gets in TN geographical areas with overlapping spectrum, or to reject any NAS request from the UE to the NTN's Public Land Mobile Network (PLMN) when the UE is in the TN geographical area with overlapping spectrum.

As an example, the NTN operating on n256 can deregister or reject a UE in areas with the following band coverage:

n65 UL, n70 DL, n34, n95 SUL n65 DL and n66 DL.

These operations can avoid transmitting n256 NTN UE (UL) to create interference at TN UE receiving (DL) on n70 or n34 (TDD), avoids transmitting n256 NTN UE (UL) to create interference at TN gNB receiving (UL) on n65, n34 (TDD), or n95 SUL. Since n256 NTN UE is not connected to NTN in the TN area (with bands n65 or n66), there is no interference on NTN UE from TN gNB operating on n65 or n66. In the NTN area (outside the TN coverage), no TN UE (UL) creates interference on NTN UE receiving on DL (not applicable to n256 DL), and no TN gNB DL (n65 or n66) interference is created on the NTN UE receiving on DL (n256).

As another example, the NTN operating on n255 can deregister or reject a UE in areas with the following band coverage:

n24 UL, n99 SUL n24 DL.

These operations can avoid transmitting n255 NTN UE (UL) to create interference at TN gNB receiving (UL) on n24 or n99 SUL. Since n255 NTN UE is not connected to NTN in the TN area (n24), there is no interference on n255 NTN UE from TN gNB operating on n24. In the NTN area (outside the TN coverage), no TN UE (UL) creates interference on NTN UE receiving on DL (not applicable to n255 DL), and no TN gNB DL (n24) interference is created on the NTN UE receiving on DL (n255).

As such, spectrum overlap can be resolved in the at least the following scenarios:

TN gNB DL does not create interference on NTN UE DL outside TN coverage

NTN UL UE does not create interference on TN UL gNB since NTN UE transmits outside TN coverage NTN UL UE does not create interference on TN DL UE since the NTN UE transmits outside TN coverage.

If the potential interference corresponds to spectrum coexistence (adjacent spectrum), actions can be performed to deregister the UE currently connected to the NTN when the UE enters TN geographical area(s) with adjacent spectrum or is predicted to enter TN area (e.g., moving down a highway and approaching the TN area), or to reject any NAS request from the UE to the NTN PLMN in the TN geographical area with adjacent spectrum. Spectrum coexistence can be resolved in at least the following scenarios:

Interference Type 1 where TN DL is an aggressor and NTN DL is a victim: TN DL OOBE will not create interference for NTN DL Interference Type 4 where NTN UL is an aggressor and TN UL is a victim: NTN UL OOBE will not create interference for TN UL Interference Type 5 where NTN UL is an aggressor and TN DL is a victim: NTN UL OOBE will not create interference for TN DL.

Similar actions can be taken for TN-NTN spectrum overlap or spectrum coexistence for other bands such as: S-Band, L-Band, C-Band, Q/V Band, Ka Band, and Ku Band.

At block 608, the process 600 includes updating at least a portion of the spectrum band coverage information of the TN and NTN. This can be achieved by obtained updated coverage information from an applicable component of the network core, a third party system or service, or active probing of TN or NTN stations. In some embodiments, the process 600 includes proceeding back to block 602 to further interact with another UE or the same UE.

Figure 7:
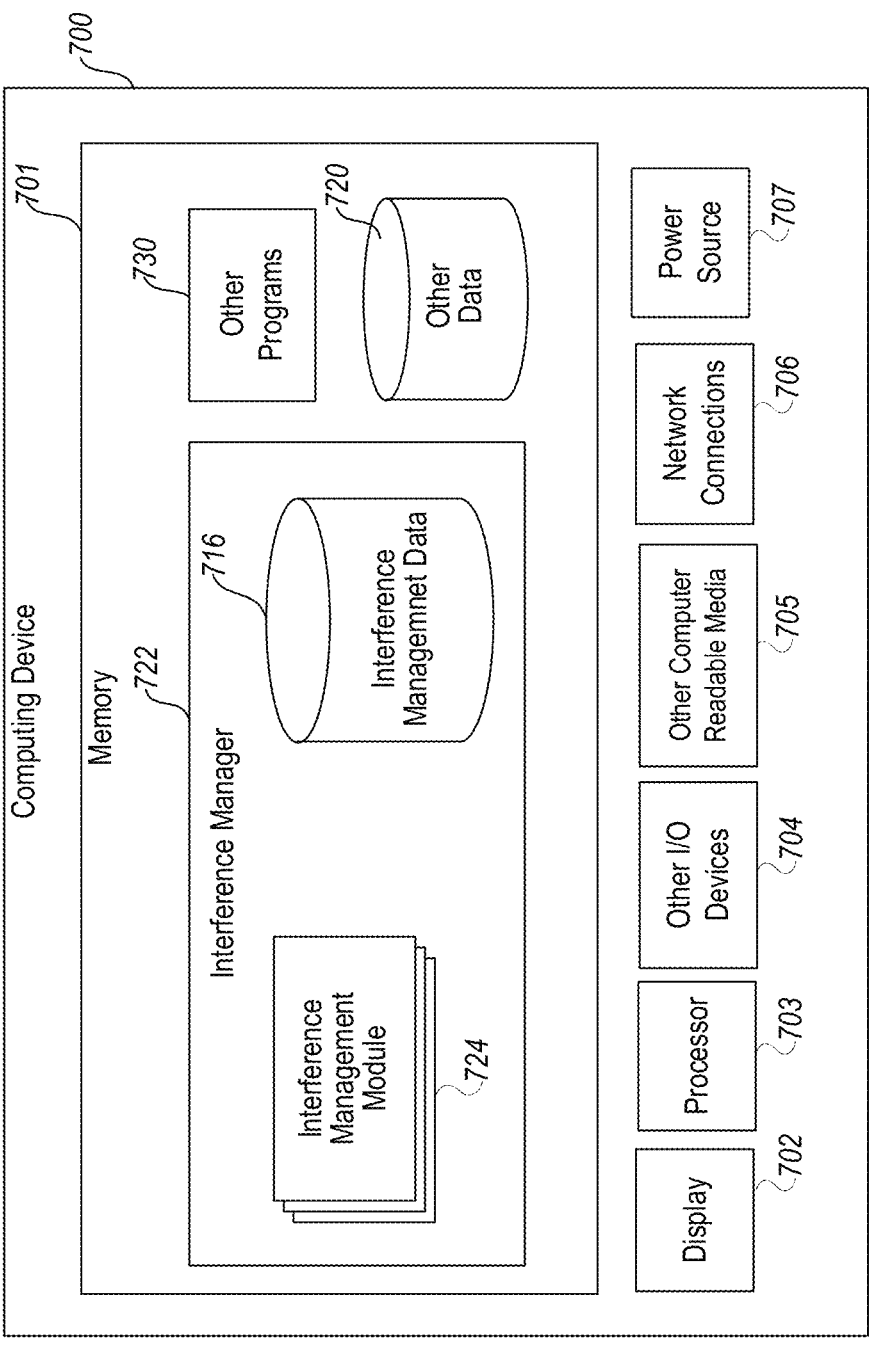
FIG. 7 is a block diagram illustrating elements of an example computing device utilized in accordance with some embodiments of the techniques described herein.

FIG. 7 is a block diagram illustrating elements of an example computing device 700 utilized in accordance with some embodiments of the techniques described herein. Illustratively, the computing device 700 corresponds to an NTN station 102 (or its corresponding base station), a UE 106, or an applicable component of network core, or at least a part thereof.

In some embodiments, one or more general purpose or special purpose computing systems or devices may be used to implement the computing device 700. In addition, in some embodiments, the computing device 700 may comprise one or more distinct computing systems or devices, and may span distributed locations. Furthermore, each block shown in FIG. 7 may represent one or more such blocks as appropriate to a specific embodiment or may be combined with other blocks. Also, the interference manager 722 may be implemented in software, hardware, firmware, or in some combination to achieve the capabilities described herein.

As shown, the computing device 700 comprises a computer memory ("memory") 701, a display 702 (including, but not limited to a light emitting diode (LED) panel, cathode ray tube (CRT) display, liquid crystal display (LCD), touch screen display, projector, etc.), one or more Central Processing Units (CPU) or other processors 703, Input/Output (I/O) devices 704 (e.g., keyboard, mouse, RF or infrared receiver, universal serial bus (USB) ports, High-Definition Multimedia Interface (HDMI) ports, other communication ports, and the like), other computer-readable media 705, network connections 706, a power source (or interface to a power source) 707. The interference manager 722 is shown residing in memory 701. In other embodiments, some portion of the contents and some, or all, of the components of the interference manager 722 may be stored on and/or transmitted over the other computer-readable media 705. The components of the computing device 700 and interference manager 722 can execute on one or more processors 703 and implement applicable functions described herein. In some embodiments, the interference manager 722 may operate as, be part of, or work in conjunction and/or cooperation with other software applications stored in memory 701 or on various other computing devices. In some embodiments, the interference manager 722 also facilitates communication with peripheral devices via the I/O devices 704, or with another device or system via the network connections 706.

The one or more interference management modules 724 is configured to perform actions related, directly or indirectly, to TN-NTN interference management as described herein. In some embodiments, the interference module(s) 724 stores, retrieves, or otherwise accesses at least some interference management related data on some portion of the interference management data storage 716 or other data storage internal or external to the computing device 700. In various embodiments, at least some of the interference management modules 724 may be implemented in software or hardware.

Other code or programs 730 (e.g., further data processing modules, communication modules, a Web server, and the like), and potentially other data repositories, such as data repository 720 for storing other data, may also reside in the memory 701, and can execute on one or more processors 703. Of note, one or more of the components in FIG. 7 mayor may not be present in any specific implementation. For example, some embodiments may not provide other computer readable media 705 or a display 702.

In some embodiments, the computing device 700 and interference manager 722 include API(s) that provides programmatic access to add, remove, or change one or more functions of the computing device 700. In some embodiments, components/modules of the computing device 700 and interference manager 722 are implemented using standard programming techniques. For example, the interference manager 722 may be implemented as an executable running on the processor(s) 703, along with one or more static or dynamic libraries. In other embodiments, the computing device 700 and interference manager 722 may be implemented as instructions processed by a virtual machine that executes as one of the other programs 730. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 700 to perform the functions of the interference manager 722. In some embodiments, instructions cause the one or more processors 703 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by an interference manager 722 implementation. Also, other functions could be implemented and/or performed by each component/module, and in different orders, and by different components/modules, yet still achieve the functions of the computing device 700 and interference manager 722.

In addition, programming interfaces to the data stored as part of the computing device 700 and interference manager 722, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The interference management data storage 716 and data repository 720 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the interference manager 722.

Furthermore, in some embodiments, some or all of the components of the computing device 700 and interference manager 722 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for managing interference between a terrestrial network (TN) and a non-terrestrial network (NTN), the method comprising:
   determining a location of a user equipment (UE);
   assessing potential interference between the TN and NTN based, at least in part, on searching spectrum band coverage information of the TN and NTN to identify all applicable spectrum bands used by the TN and NTN within a proximity threshold of the determined location of the UE;
   receive information indicating whether the UE is currently using the TN or the NTN;
   in response to the UE currently using the NTN, acting on the UE's connection to the NTN or-based, at least in part, on the assessed potential interference and the information indicating that the UE is currently using the NTN; and
   in response to the UE currently using the TN, acting on a request from the UE for connection to the NTN based, at least in part, on the assessed potential interference and the information indicating whether the UE is currently using the TN; and
   updating the spectrum band coverage information of the TN and NTN.

2. The method of claim 1, wherein the location of the UE includes a geographic point or area where the UE is currently connected with or attempting to connect with the NTN.

3. The method of claim 1, wherein the determining of the location of the UE is based on at least one of Global Navigation Satellite System (GNSS) or Global Positioning System (GPS) that the UE supports.

4. The method of claim 1, wherein assessing potential interference between the TN and NTN comprises determining at least one of spectrum overlap or spectrum coexistence between the TN and NTN.

5. The method of claim 1, wherein acting on the UE's connection to the NTN or a request from the UE for connection to the NTN comprises at least one of deregistering the UE connected to the NTN, maintaining the UE's connection to the NTN, rejecting the request from the UE for connection to the NTN, or accepting the request from the UE for connection to the NTN.

6. The method of claim 5, wherein at least one of the deregistering the UE connected to the NTN or rejecting the request from the UE for connection to the NTN is performed in accordance with Mobility Management and Session Management procedures.

7. The method of claim 1, wherein the spectrum band coverage information of the TN and NTN includes a map indicating geographical coverage of one or more spectrum bands used by the TN or NTN.

8. An interference management system for terrestrial network (TN) and non-terrestrial network (NTN), comprising:

at least one memory that stores computer executable instructions; and at least one processor that executes the computer executable instructions to cause actions to be performed, the actions comprising:

determining a location of a user equipment (UE);

searching spectrum band coverage information of the TN and NTN to identify all applicable spectrum bands used by the TN and NTN within a proximity threshold of the determined location of the UE;

assessing potential interference between a TN and an NTN based, at least in part, on a subset of the identified applicable spectrum bands;

receiving information indicating whether the UE is currently using the TN or the NTN; and acting on the UE's connection to the NTN or a request from the UE for connection to the NTN based, at least in part, on the assessed potential interference and the information indicating whether the UE is currently using the TN or the NTN.

9. The system of claim 8, wherein the location of the UE includes a geographic point or area where the UE is currently connected with or attempting to connect with the TN or NTN.

10. The system of claim 8, wherein assessing potential interference between the TN and NTN comprises determining at least one of spectrum overlap or spectrum coexistence between the TN and NTN.

11. The system of claim 8, wherein acting on the UE's connection to the NTN or a request from the UE for connection to the NTN comprises at least one of deregistering the UE connected to the NTN, maintaining the UE's connection to the NTN, rejecting the request from the UE for connection to the NTN, or accepting the request from the UE for connection to the NTN.

12. The system of claim 11, wherein at least one of the deregistering the UE connected to the NTN or rejecting the request from the UE for connection to the NTN is performed in accordance with Mobility Management and Session Management procedures.

13. The system of claim 8, wherein the actions further comprise obtaining updated spectrum band coverage information of the TN and NTN.

14. A non-transitory computer-readable medium storing contents that, when executed by one or more processors, cause the one or more processors to perform actions comprising:

determining a location of a user equipment (UE);

assessing potential interference between a TN and an NTN based, at least in part, on searching spectrum band coverage information of the TN and NTN to identify all applicable spectrum bands used by the TN and NTN within a distance threshold of the determined location of the UE;

receiving information indicating whether the UE is currently using the TN or the NTN; and acting on the UE's connection to the NTN or a request from the UE for connection to the NTN based, at least in part, on the assessed potential interference and the information indicating whether the UE is currently using the TN ort the NTN.

15. The computer-readable medium of claim 14, wherein the location of the UE includes a geographic point or area where the UE is currently connected with or attempting to connect with the TN or NTN.

16. The computer-readable medium of claim 14, wherein the actions further comprise updating at least a portion of the spectrum band coverage information.

17. The computer-readable medium of claim 14, wherein assessing potential interference between the TN and NTN comprises determining at least one of spectrum overlap or spectrum coexistence between the TN and NTN.

18. The computer-readable medium of claim 14, wherein acting on the UE's connection to the NTN or a request from the UE for connection to the NTN comprises at least one of deregistering the UE connected to the NTN, maintaining the UE's connection to the NTN, rejecting the request from the UE for connection to the NTN, or accepting the request from the UE for connection to the NTN.

19. The computer-readable medium of claim 18, wherein at least one of the deregistering the UE connected to the NTN or rejecting the request from the UE for connection to the NTN is performed in accordance with Mobility Management and Session Management procedures.

20. The computer-readable medium of claim 14, wherein the spectrum band coverage information of the TN and NTN includes a map indicating geographical coverage of one or more spectrum bands used by the TN or NTN.

* * * * *